(12) United States Patent
Castille

(10) Patent No.: US 10,330,442 B2
(45) Date of Patent: Jun. 25, 2019

(54) REVERSIBLE CAMOUFLAGE MATERIAL

(71) Applicant: W. L. Gore & Associates, Inc., Newark, DE (US)

(72) Inventor: Matthew J. Castille, Charlottesville, VA (US)

(73) Assignee: W. L. Gore & Associates, Inc., Newark, DE (US)

( * ) Notice: Subject to any disclaimer, the term of this patent is extended or adjusted under 35 U.S.C. 154(b) by 282 days.

(21) Appl. No.: 15/203,830

(22) Filed: Jul. 7, 2016

(65) Prior Publication Data

US 2016/0320161 A1  Nov. 3, 2016

Related U.S. Application Data

(62) Division of application No. 13/781,062, filed on Feb. 28, 2013.

(51) Int. Cl.
*F41H 3/02* (2006.01)
*B32B 3/10* (2006.01)
(Continued)

(52) U.S. Cl.
CPC ............... *F41H 3/02* (2013.01); *B32B 3/10* (2013.01); *B32B 3/26* (2013.01); *B32B 5/024* (2013.01);
(Continued)

(58) Field of Classification Search
CPC ..... G02B 5/208; G02B 1/18; Y10T 428/2481; Y10T 428/24942; Y10T 428/24998;
(Continued)

(56) References Cited

U.S. PATENT DOCUMENTS 5,418,054 A  5/1995  Sun
5,708,044 A  1/1998  Branca
(Continued)

FOREIGN PATENT DOCUMENTS

GB  2222608  1/1992
GB  2420169  4/2008
(Continued)

OTHER PUBLICATIONS

Supplementary European Search Report dated Sep. 2, 2016 for EP14798649.

*Primary Examiner* — Vincent Tatesure
(74) *Attorney, Agent, or Firm* — Greenberg Traurig, LLP

(57) ABSTRACT

A reversible camouflage material including a textile layer having a woodland camouflage print thereon, an infrared suppressing layer, and a textile layer having a desert camouflage print thereon is provided. The infrared suppressing layer may include a polyurethane layer sandwiched between a carbon-containing ePTFE layer and an ePTFE layer. The carbon may be provided in an oleophobic layer on the ePTFE or within the ePTFE film. In one embodiment, the desert camouflage textile is absent and a coating composition that includes a colorant and infrared suppressive additives is applied to the outer surface of the ePTFE layer. The inventive camouflage material demonstrates camouflage concealment in the near IR (nIR) and short wave infrared (SWIR) wavelengths of the electromagnetic spectrum. In addition, the camouflage material is highly breathable and lightweight. The material is particularly suitable for making reversible camouflage garments such as jackets and pants.

45 Claims, 5 Drawing Sheets

(51) Int. Cl.
| | |
|---|---|
| *B32B 3/26* | (2006.01) |
| *B32B 7/02* | (2019.01) |
| *B32B 7/12* | (2006.01) |
| *B32B 7/14* | (2006.01) |
| *G02B 5/20* | (2006.01) |
| *B32B 27/40* | (2006.01) |
| *G02B 1/18* | (2015.01) |
| *G02B 1/04* | (2006.01) |
| *B32B 5/02* | (2006.01) |
| *B32B 5/16* | (2006.01) |
| *B32B 27/12* | (2006.01) |
| *B32B 27/32* | (2006.01) |

(52) U.S. Cl.
CPC .................. *B32B 5/16* (2013.01); *B32B 7/02* (2013.01); *B32B 7/12* (2013.01); *B32B 7/14* (2013.01); *B32B 27/12* (2013.01); *B32B 27/322* (2013.01); *B32B 27/40* (2013.01); *G02B 1/04* (2013.01); *G02B 1/18* (2015.01); *G02B 5/208* (2013.01); *B32B 2255/02* (2013.01); *B32B 2255/26* (2013.01); *B32B 2264/0257* (2013.01); *B32B 2307/30* (2013.01); *B32B 2307/40* (2013.01); *B32B 2307/724* (2013.01); *B32B 2307/7265* (2013.01); *B32B 2437/00* (2013.01); *B32B 2571/00* (2013.01); *Y10T 428/2481* (2015.01); *Y10T 428/24942* (2015.01); *Y10T 428/24998* (2015.04)

(58) Field of Classification Search
CPC .... F41H 3/02; B32B 3/10; B32B 3/26; B32B 7/02; B32B 7/12; B32B 7/14
USPC ...................................... 428/196, 212, 315.9
See application file for complete search history.

(56) References Cited

U.S. PATENT DOCUMENTS

| | | | |
|---|---|---|---|
| 5,750,242 | A | 5/1998 | Culler |
| 6,074,738 | A * | 6/2000 | von Fragstein ........ A41D 31/02 428/315.9 |
| 6,541,589 | B1 | 4/2003 | Baillie |
| 7,531,611 | B2 | 5/2009 | Sabot et al. |
| 2005/0266228 | A1 | 12/2005 | Jain |
| 2007/0009679 | A1 | 1/2007 | Holcombe et al. |
| 2009/0214852 | A1 | 8/2009 | Kelsey |
| 2010/0028624 | A1 | 2/2010 | Smith et al. |

FOREIGN PATENT DOCUMENTS

| | | |
|---|---|---|
| JP | 06-137794 | 5/1994 |
| JP | 2003-262498 | 9/2003 |
| WO | WO-97/49552 A1 | 12/1997 |
| WO | WO-2009/064368 A1 | 5/2009 |
| WO | WO-2013/022548 A1 | 2/2013 |

* cited by examiner

REVERSIBLE CAMOUFLAGE MATERIAL

FIELD OF THE INVENTION

The present invention relates generally to camouflage materials, and more specifically, to a reversible camouflage material that demonstrates controlled reflectance in both the nIR and SWIR regions of the electromagnetic radiation spectrum on both sides of the garment while demonstrating high breathability on both sides of the material.

BACKGROUND OF THE INVENTION

Camouflage textile materials used by hunters and by the military typically provide camouflage in the visible region of the electromagnetic radiation spectrum (400-700 nm). Due to the vastly diverse environments throughout the world, many different camouflage materials exist, including both visibly camouflaged and non-visibly camouflaged materials. The variety of environments (e.g., ranging from woodland to desert) necessitates the use of a variety of colors and patterns to create these camouflage textile materials. For instance, in a military woodland camouflage, the materials often use four colors: black, coyote, khaki, and green. In a military desert camouflage, the textile materials often use four colors: highland, light coyote, urban tan, and light tan. Many visible shade variations exist even within these two examples. Textiles with visible camouflage patterns are typically manufactured by printing the camouflage pattern on an undyed (greige) textile (e.g., woven, knit, non-woven, etc.) surface or by solution dying yarns that are subsequently woven or knitted into a camouflage pattern using, for instance, a jacquard process.

In some applications it is desirable to use textile materials that provide camouflage in other areas of the electromagnetic spectrum (e.g., beyond visible). In particular, advances in image intensifiers used in night vision equipment have heightened the need for improved camouflage in the near infrared ("nIR") (i.e., 700-900 nm) and short wave infrared (SWIR) (i.e., 900-1700 nm) electromagnetic radiation spectrum. Typical night vision equipment amplifies low intensity electromagnetic radiation in the visible, nIR, and SWIR spectra, with specific sensitivity in the nIR and SWIR. Like camouflage in the visible spectrum, camouflage in the nIR and SWIR spectra enables the material, and thus the wearer or covered structure, to blend in with the environment. A primary difference is that, unlike the visible camouflage, nIR and SWIR camouflage does not involve a further segmentation of discrete bands of the spectrum (that in the visible gives rise to color separation). As such, effective camouflage in the nIR and SWIR spectra requires a material to have an appropriate balance of reflection, or reflectance, and transmittance/absorbance over the whole nIR and SWIR spectra. In addition, the ability to detect and identify an object using image intensifiers (such as night vision goggles) also depends on the ability to disrupt the silhouette or the shape of the object.

Conventional means for achieving desirable camouflage in both the visible, nIR, and SWIR is through a printing process wherein undyed textiles or textiles dyed to a base shade are printed to simultaneously achieve multiple colors (visible spectrum) and levels of nIR and SWIR reflectance. Most commonly, carbon black is added to the camouflage print ink or paste in varying amounts to vary the nIR and SWIR reflectance of the resulting textile. A disadvantage to this technique is that the carbon can negatively impact the desired visible shade of the camouflage textile and frequently results in a compromise between achieving appropriate visible and nIR camouflage, particularly in environments which require extremely light shades like the desert. In addition, topically treating textiles with such a carbon finish results in a textile material with poor nIR camouflage durability, as the topical carbon finishing can readily wash and/or wear off in use.

A further challenge in creating camouflage textiles which are suitable for the applications described is the need for comfort of the user. In outdoor environments, comfort in a variety of weather conditions requires that the textiles, and resulting articles, be liquidproof and breathable for optimum comfort. However, providing environmental protection by coating or lamination of liquidproof, breathable films or coatings can also affect the visible, nIR, and SWIR camouflage properties of the textile. For example, in the specific case of a liquidproof breathable film comprising microporous PTFE, the PTFE film often increases the overall reflectivity in the nIR spectrum, and possibly the visible spectrum as well, resulting in undesirable tradeoffs between durable environmental protection and nIR and SWIR camouflage.

Recent improvements to military camouflage have extended performance into the nIR portion and the short wave infrared (SWIR). Thus, there exists a need in the art for a camouflage material that achieves camouflage protection in both the nIR and SWIR spectra and that provides the desired physical and protection properties needed and comfort qualities desired in a camouflage garment.

SUMMARY OF THE INVENTION

It is an object of the present invention to provide a reversible article that includes (1) a center structure including a polyurethane layer sandwiched between a first microporous film and a second microporous film having thereon an oleophobic layer containing at least one infrared suppressive additive, (2) a first textile layer positioned on the first microporous film, and (3) a second textile layer positioned on the second microporous film. The infrared suppressive performance on one surface of the reversible article is different from the opposing surface of the reversible article. The first textile layer is adhered to the first microporous film and the second textile layer is adhered to the second microporous film. The first and second microporous films may be expanded polytetrafluoroethylene. In one exemplary embodiment, the oleophobic layer is a fluoroacrylate oleophobic coating and the infrared suppressive additive is carbon. The inventive camouflage material demonstrates camouflage concealment in the near IR (nIR) and short wave infrared (SWIR) wavelengths of the electromagnetic spectrum on both sides of the material. In particular, both surfaces of the reversible article demonstrate an average reflection less than about 75% or less in the wavelength range from about 700 nm to about 900 nm and an average reflection less than about 85% in the wavelength range from about 900 nm to about 1700 nm.

It is another object of the present invention to provide a reversible article that includes (1) a center structure including a polyurethane layer sandwiched between a first microporous film and a second microporous film having thereon an oleophobic layer, (2) a first textile layer positioned on the first microporous film, and (3) a second textile layer positioned on the second microporous film. The second microporous film contains at least one infrared suppressive additive within the microporous film. In exemplary embodiments, the infrared suppressive additive is distributed throughout the microporous film. A first adhesive layer bonds the first textile layer to the first microporous film and a second adhesive layer bonds the second textile layer to the second microporous film. The infrared suppressive performance on one surface of the reversible article is different from the opposing surface of the reversible article. Additionally, the moisture vapor transmission rates of the opposing surfaces of the reversible article are substantially the same. In some exemplary embodiments, the second microporous film is treated with differing levels of infrared suppressive additives to create multiple regions of reflection.

It is yet another object of the present invention to provide a reversible article that includes (1) an infrared suppressing layer including a polyurethane layer sandwiched between a first microporous film and a second microporous film having thereon a coating composition containing at least one colorant and at least one infrared suppressive additive where the second microporous film forms a first outer surface, (2) a textile layer positioned on the first microporous film where the textile layer forms a second outer surface, and (3) an adhesive layer positioned between the textile layer and the first microporous film. The coating composition includes a sufficient amount of colorant to colorize the second microporous film and infrared suppressive additives to achieve nIR and SWIR reflectance. The printed microporous film is colorized on at least 90% of the outer film surface.

It is a further object of the present invention to provide a reversible article that includes (1) a center structure including a first microporous film bonded to a second microporous film having thereon an oleophobic coating containing at least one infrared suppressive additive, (2) a first textile layer positioned on the first microporous film, and (3) a second textile layer positioned on the second microporous film. The infrared suppressive performance on one surface of the reversible article is different from the opposing surface of the reversible article. The first and second microporous films may be bonded together via a continuous or a discontinuous adhesive. Alternatively, the first microporous film and the second microporous film may form the center structure in the absence of an adhesive. In one exemplary embodiment, the first microporous film has thereon a coating that contains at least one infrared suppressive additive. The first and second microporous films may be expanded polytetrafluoroethylene.

It is a feature of the present invention that the two outer surfaces of the reversible material have differing infrared reflectivity.

It is also a feature of the present invention that the reversible materials are highly breathable and lightweight.

It is a further feature of the present invention that both a desert camouflage and a woodland camouflage are present in a single, reversible article that demonstrates camouflage concealment in the near nIR and SWIR wavelengths of the electromagnetic spectrum on both sides of the article.

It is yet another feature of the present invention that the nIR and SWIR reflectance can be tailored by altering the amount of infrared suppressive additive present in the ePTFE layer.

BRIEF DESCRIPTIONS OF FIGURES

The advantages of this invention will be apparent upon consideration of the following detailed disclosure of the invention, especially when taken in conjunction with the accompanying drawings wherein.

DETAILED DESCRIPTION OF THE INVENTION

Figure 1:
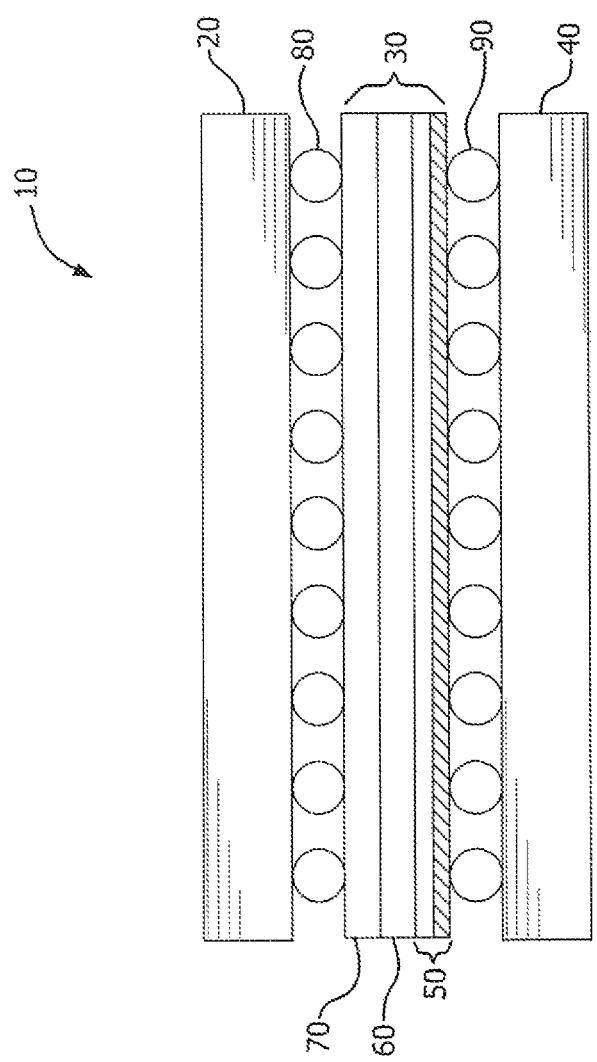
FIG. 1 is a schematic illustration of a reversible camouflage material including a center structure that includes a polyurethane layer sandwiched between a first microporous film and a second microporous film and two outer facing textile materials according to one exemplary embodiment of the invention.

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, the preferred methods and materials are described herein.

In the drawings, the thickness of the lines, layers, and regions may be exaggerated for clarity. It will be understood that when an element such as a layer, region, substrate, or panel is referred to as being "on" another element, it can be directly on the other element or intervening elements may also be present. Also, when an element is referred to as being "adjacent" to another element, the element may be directly adjacent to the other element or intervening elements may be present. It is to be noted that like numbers found throughout the figures denote like elements. As used herein, "visible" refers to 400-700 nm, "nIR" refers to near infrared 700-900 nm, and "SWIR" refers to 900-1700 nm in the electromagnetic radiation spectrum. The terms "camouflage material" and "material" may be used interchangeably herein.

The invention relates to a reversible camouflage material that has a woodland camouflage print on one side of the material and a desert camouflage print on the opposing side of the material. The inventive camouflage material demonstrates camouflage concealment in the near IR (nIR) and short wave infrared (SWIR) wavelengths of the electromagnetic spectrum. In addition, the camouflage material is both highly breathable and lightweight. The material is particularly suitable for making reversible camouflage garments such as jackets and pants.

Reference is first made to FIG. 1, which illustrates a reversible camouflage material 10 according to at least one embodiment of the present invention. The reversible material 10 is a three-layer structure formed of a first textile layer 20 having a woodland camouflage print thereon, an expanded polytetrafluoroethylene (ePTFE) substrate 30 (infrared suppressing layer), and a second textile layer 40 having a desert camouflage print thereon. The ePTFE substrate contains a polyurethane layer 60 sandwiched between a carbon-containing ePTFE layer 50 and an ePTFE layer 70.

The carbon-containing ePTFE layer 50 may be coated with carbon or the carbon may be positioned throughout the ePTFE layer. The polyurethane layer 60 acts as an adhesive to bond the two ePTFE layers 50, 70 together. ePTFE membranes having a thickness from about 0.2 mil to about 5.0 mil may be utilized. In at least one exemplary embodiment, the ePTFE membrane thickness is less than or equal to 2.0 mil, or less than or equal to 1.0 mil. It is to be noted that the infrared suppressive performance is different from one side of the reversible material to the opposing side. The phrase "infrared suppressive performance" as used herein is meant to denote that the outer surfaces of the reversible camouflage material have different nIR and SWIR reflective camouflage performance. For example, one surface may be nIR and SWIR reflective for a dry soil environment and the opposing surface may be nIR and SWIR reflective for a foliage environment.

Figure 3:
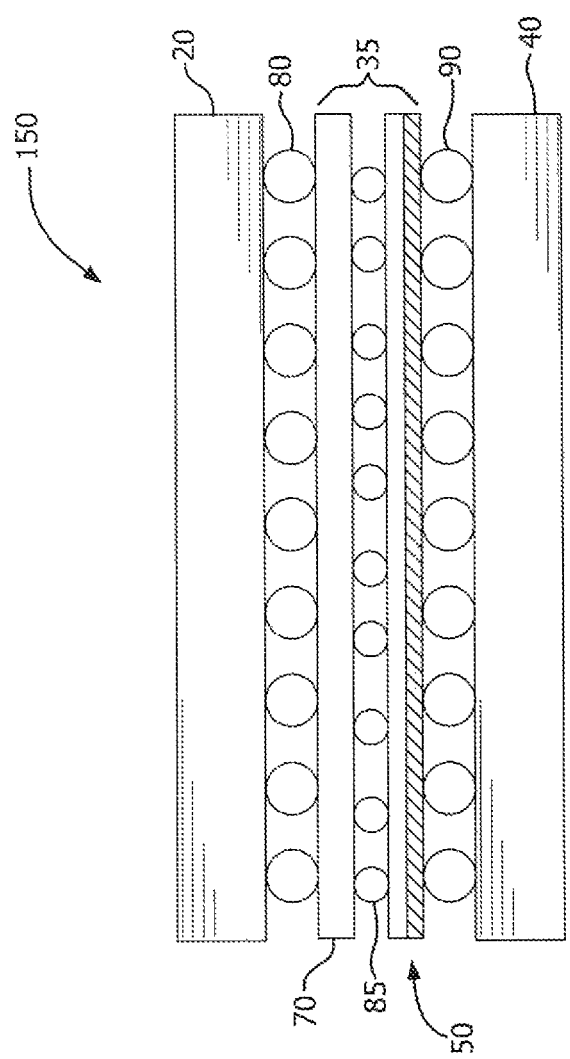
FIG. 3 is a schematic illustration of a reversible camouflage material including an infrared suppressing layer that contains two ePTFE layers adhered via a discontinuous adhesive.
Figure 4:
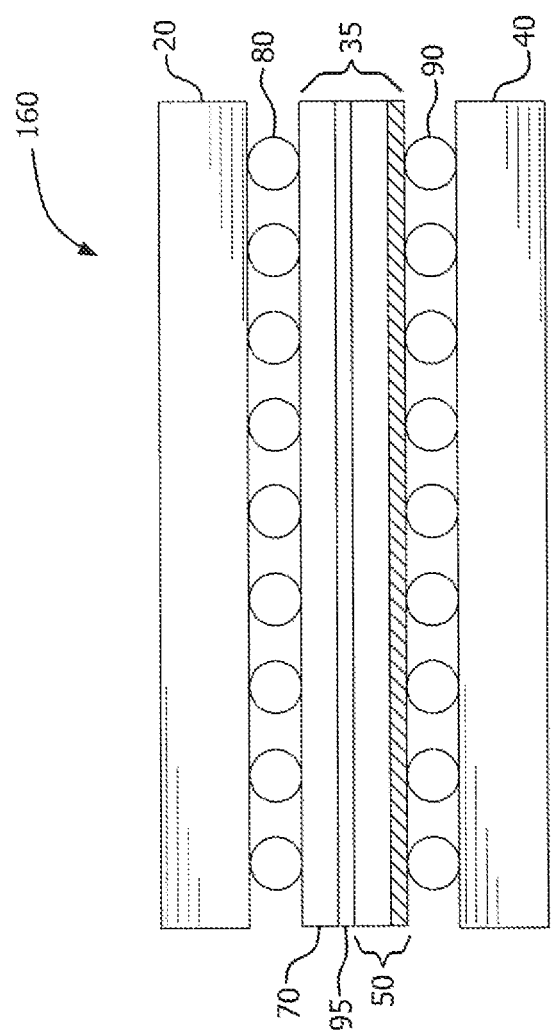
FIG. 4 is a schematic illustration of a reversible camouflage material including an infrared suppressing layer that contains two ePTFE layers adhered via a continuous adhesive.
Figure 5:
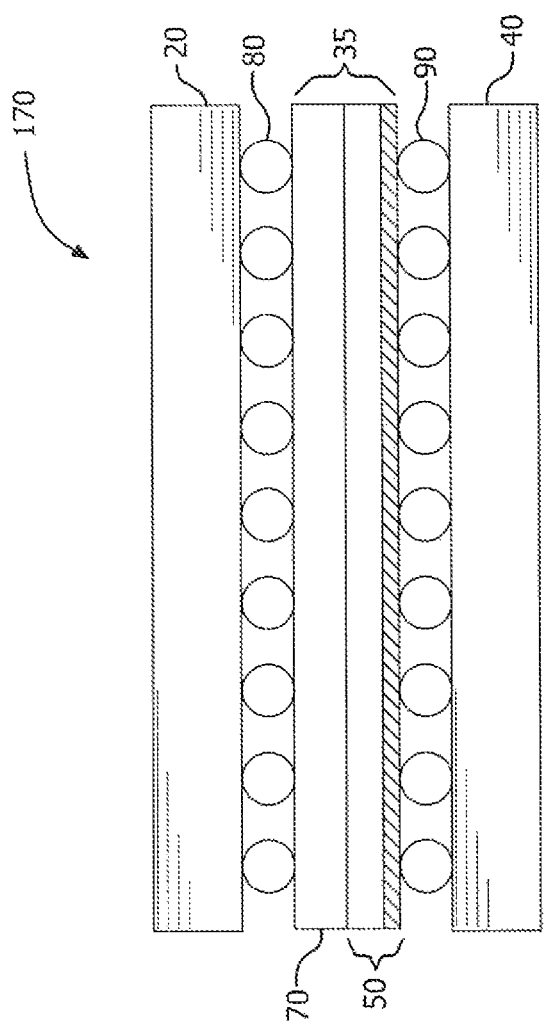
FIG. 5 is a schematic illustration of a reversible camouflage material including an infrared suppressing layer that contains two ePTFE layers bonded without an adhesive.

In alternate exemplary embodiments, the carbon-containing ePTFE layer 50 and the ePTFE layer 70 are bonded by an adhesive, such as is depicted in FIGS. 3 and 4. In particular, FIG. 3 illustrates a reversible material 150 that contains a center structure 35 (infrared suppressing layer) where the carbon-containing ePTFE layer 50 and the ePTFE layer 70 are bonded by a discontinuous adhesive 85. A reversible material 160 where a continuous adhesive 95 bonds the carbon-containing ePTFE layer 50 and the ePTFE layer 70 is depicted in FIG. 4. FIG. 5 depicts a reversible material 170 where the carbon-containing ePTFE layer 50 and the ePTFE layer 70 are bonded together without an adhesive.

It is to be appreciated that reference is made herein with respect to expanded polytetrafluorethylene (ePTFE) for ease of discussion. However, it is to be understood that any suitable expanded fluoropolymer membrane may be used interchangeably with any ePTFE layer described within this application. Non-limiting examples of expandable fluoropolymers include, but are not limited to, expanded PTFE, expanded modified PTFE, expanded copolymers of PTFE, fluorinated ethylene propylene (FEP), and perfluoroalkoxy copolymer resin (PFA). Patents have been filed on expandable blends of PTFE, expandable modified PTFE, and expanded copolymers of PTFE, such as, but not limited to, U.S. Pat. No. 5,708,044 to Branca; U.S. Pat. No. 6,541,589 to Baillie; U.S. Pat. No. 7,531,611 to Sabol et al.; U.S. patent application Ser. No. 11/906,877 to Ford; and U.S. patent application Ser. No. 12/410,050 to Xu et al. Porous membranes including polymeric materials such as polyolefins (e.g., polypropylene and polyethylene), polyurethanes, polyesters, polyamides, polyvinyls, polyvinyl chlorides, acrylics, silicones, epoxies, synthetic rubbers, other thermoset polymers, and copolymers of these types are considered to be within the purview of the invention provided that the polymeric material can be processed to form porous or microporous membrane structures.

One method of accomplishing nIR and SWIR reflectance within the reversible material 10 is by coating or imbibing the carbon into or on the film surface. Carbon is used herein for ease of discussion. It is to be appreciated that any infrared suppressive additive can be used in place of, or in addition to, the carbon. In an embodiment where the ePTFE layer 50 is coated with a layer of carbon, any conventional application method may be employed to place a coating composition containing carbon onto the carbon-coated ePTFE layer 50. Application methods for coating the ePTFE layer 50 with carbon include but are not limited to, transfer coating, screen printing, gravure printing, ink-jet printing, and knife coating. Additional topical treatments can be applied to the ePTFE layer 50, provided sufficient porosity throughout the ePTFE substrate 30 is maintained to remain moisture vapor transmissivity. For example, an oleophobic treatment, such as a fluoroacrylate oleophobic coating, may be applied to the ePTFE layer 50. It is to be appreciated that the oleophobic treatment may be applied in conjunction with the application of carbon, or prior to or subsequent to the application of the carbon coating.

Achieving the unique balance of visible and near infrared electromagnetic characteristics of the reversible material 10 requires a near infrared suppressive additive that can decrease the nIR and SWIR reflectivity of the substrate 30 while maintaining a light shade visible appearance. It is to be noted that a range of additives suitable for decreasing the nIR and SWIR reflectivity are available and can be used in place of, or in addition to, the carbon described above. Non-limiting exemplary additives include inorganic materials such as, but not limited to, metals, and metal oxides, metal compounds, such as, but not limited to, aluminum, aluminum oxide, antimony, antimony oxide, titanium, titanium oxide, cadmium selinide, gallium arsenide, and the like, and organic materials such as, but not limited to, conductive polymers and those described in U.K. Patent Application No. GB 2,222,608A.

In an embodiment where the carbon (or other infrared suppressive additive) is included within or substantially within the ePTFE layer 50, the infrared suppressive material/additive(s) that provide the nIR and SWIR suppression can either be soluble in the polymeric matrix or exist as discrete particles. In either instance, the infrared suppressive additives should be uniformly or substantially uniformly dispersed in the polymeric matrix.

Infrared suppressive additive loadings onto and/or into the carbon-containing ePTFE layer 50 can be varied depending on the combination of properties desired. For example, carbon levels on the order of about 1% by weight have been surprisingly found to be effective in nIR and SWIR suppression while simultaneously providing excellent shade retention in the articles. Infrared suppressive additive(s) in an amount from about 1% to about at least 15% by weight, or more, may be present in the carbon-containing ePTFE layer. In the presence of other reflective materials (e.g., $TiO_2$ and the like) in the carbon-containing ePTFE layer 50, higher loadings of carbon can be used to achieve the desired balance of absorption and reflectance in the nIR, SWIR, and visible spectra.

Conversely, at carbon levels on the order of 5% by weight and higher, and even at levels down to 1% by weight, in the absence of other reflective materials in the ePTFE layer 50, it has been observed that the resulting membrane will appear black to the unaided eye and would darken the shade of any light color textiles to which it is attached. Resulting textile composites from these carbon loading levels show significant and unacceptable darkening of the light color visible camouflage to which it is adhered. This light color shade shifting is particularly problematic in daylight situations, which is also when visible camouflage with the correct shades is most essential.

In some exemplary embodiments, the carbon-containing ePTFE layer 50 is treated with differing levels of infrared suppressive additives to create multiple regions of reflection (analogous to camouflage printing of textiles). This allows for the incorporation of a nIR/SWIR disruptive pattern into the film layer. The pattern applied or achieved by the application of the infrared suppressive additive could be altered in a variety of ways to achieve the particular nIR and/or SWIR disruptive pattern desired. It is to be appreciated that there are numerous ways to achieve multiple levels of reflectance within the carbon-containing ePTFE layer, including, but not limited to, using multiple types of infrared suppressive additives, chemical modification, coating on an imbibed polymer (e.g., a carbon-imbibed ePTFE layer 50), or combinations thereof. It is also within the purview of the invention alter the nIR/SWIR reflectance by physically altering the carbon-containing ePTFE layer 50 such as by densifying or abrading select areas of the ePTFE membrane.

It is important that the carbon-containing ePTFE layer 50 not exhibit too dark of a shade in the visible light spectrum. For instance, if the nIR suppressive layer is too dark, it will alter the shade of the desert camouflaged textile behind which it is located.

Turning back to FIG. 1, the first and second textile layers 20, 40 are bonded to the ePTFE substrate 30 by adhesive layers 80, 90, respectively. In addition, the first textile layer 20 is positioned adjacent to the ePTFE layer 70 and the second textile layer 40 is positioned adjacent to the carbon-containing ePTFE layer 50. Any suitable process for joining the ePTFE substrate 30 and the first and second textile layers 20, 40 may be used, such as gravure lamination, fusion bonding, spray adhesive bonding, and the like. The adhesive may be applied discontinuously or continuously, provided that breathability through the camouflage material 10 is maintained. For example, the adhesive may be applied in the form of discontinuous attachments, such as by discrete dots, or in the form of an adhesive web to adhere the first and second textile layers 20, 40 to the PTFE substrate 30 together.

The first and second textile layers 20, 40 may be formed of a woven, knit, or non-woven material, and it may be comprised of materials such as, but not limited to cotton, rayon, nylon, polyester, and blends thereof. The weight of the textile forming the first and second textile layers 20, 40 is not particularly limited except as required by the application. In exemplary embodiments, the textile is air permeable. As discussed above, the textile layers 20, 40 are printed with a woodland camouflage pattern and a desert camouflage pattern, respectively. The ink used for printing the camouflage patterns contains nIR suppressive materials such as carbon to aid in nIR and SWIR camouflage. Application methods for printing the surface of the textile layers 20, 40 include but are not limited to, transfer coating, screen printing, gravure printing, ink-jet printing, and knife coating.

Figure 2:
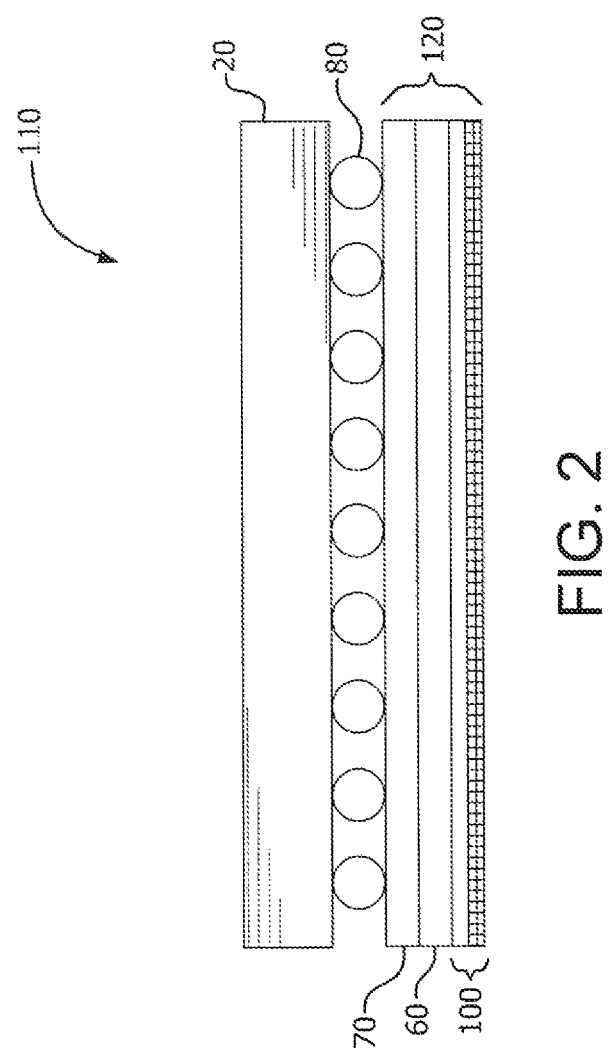
FIG. 2 is a schematic illustration of a reversible camouflage material including an infrared suppressing layer that includes a polyurethane layer sandwiched between a first microporous film and a second microporous film having thereon a coating composition that contains at least one colorant and at least one infrared suppressive additive according to another exemplary embodiment of the invention.

In another exemplary embodiment, the reversible material is formed of a first textile layer 20 having a woodland camouflage print thereon and an infrared suppressing layer 120. The infrared suppressing 120 contains an adhesive layer 60 sandwiched between a printed ePTFE layer 100 and an ePTFE layer 70. The adhesive layer may be polyurethane. Such a reversible material 110 is shown in FIG. 2. In this embodiment, a coating composition that includes a colorant to colorize the ePTFE layer 100 and infrared suppressive additives to achieve nIR and SWIR reflectance is applied to the outer surface of the printed ePTFE layer 100.

In instances where the printed layer 100 is formed of ePTFE, the coating composition coats or encapsulates the nodes and/or fibrils of the expanded fluoropolymer structure forming a durable aesthetic appearance. Aesthetic durability can be achieved in some embodiments with colorant coating compositions that comprise a pigment having a particle size sufficiently small to fit within the pores of the porous substrate. Pigment particles having a mean diameter of less than about 250 nm are useful for forming durable color. Coating compositions may further comprise a binder capable of wetting the porous substrate and binding the pigment to the pore walls. Additional treatments may be provided to impart a desired functionality to the ePTFE layer 100. As one non-limiting example, oleophobic treatments may be applied to render the ePTFE layer 100 oleophobic.

Multiple colors can be applied using multiple pigments, or varying the concentrations of one or more pigments, or by both techniques. The printed ePTFE layer 100 is colorized on at least 90% of the outer film surface. Any of the conventional printing techniques described herein may be utilized to print the outer surface of the ePTFE layer 100 so long as the ePTFE substrate 120 maintains moisture vapor transmission. In one embodiment, the surface of the film can be colorized with a colorant to form a solid color or a pattern (design). Coating compositions comprising colorants can be applied to provide a variety of colors and designs, such as solid, camouflage, and various print patterns. Additionally, the coating compositions may include one or more colorants suitable for use in printing camouflage patterns, such as woodland and desert patterns. In exemplary embodiments, the coating composition including highland, light coyote, urban tan, and light tan colorant suitable for printing a desert camouflage pattern. Other compositions that include colorants shade variations are considered within the purview of the invention.

Moisture vapor transmission, or breathability, is important to provide cooling to a wearer of the outerwear apparel made from reversible materials described herein. Fabric textiles described herein are breathable and have a moisture vapor transmission rate (MVTR) that is greater than about 4500 $g/m^2/24$ hours, greater than about 8000 $g/m^2/24$ hours, greater than about 12000 $g/m^2/24$ hours, or greater than about 16000 $g/m^2/24$ hours when tested according to the MVTR Test Method described herein. Also, the moisture vapor transmission rate of the reversible material is the surprisingly the same or substantially the same on both sides for the embodiment depicted in FIG. 1 and described herein. The reversible materials are also lightweight, and may have a mass/area less than about 300 $g/m^2$, less than about 200 $g/m^2$, less than about 100 $g/m^2$, or less than about 65 $g/m^2$.

In order to achieve optimal results in a nIR application, it is desirable to control the spectral response to create a reversible article that has nIR and SWIR reflectance that is neither too high nor too low. For example, a nIR and SWIR reflectance that is too high relative to the surrounding environment creates a bright silhouette under night vision. Equally, a reflectance that is too low creates a dark silhouette relative to the surrounding environment under night vision. For articles with areas of different reflectance levels (i.e., nIR/SWIR disruptive pattern), there will typically be areas that are very nIR and/or SWIR suppressive and areas that are only moderately reflective. It is to be understood that the optimum reflectance levels varies with the environment.

The reversible materials described herein demonstrate nIR and SWIR suppression of incident electromagnetic radiation in the nIR and SWIR wavelength range on both sides of the material. Such nIR and SWIR suppression is particularly useful because reduced reflectivity in these wavelength ranges reduce the visibility of an article when viewed in the dark with a night vision scope. The nIR absorption characteristic of the reversible materials provide an average reflection of about 75% or less in the wavelength range of about 700 nm to about 900 nm. The nIR absorption characteristic may be tailored to provide an average reflection of less than about 65%, less than 55%, or less than about 45% in the wavelength range of about 700 nm to about 900 nm.

The SWIR absorption characteristic of the reversible materials provides an average reflection from about 10% to about 85% in the wavelength range of about 900 nm to about 1700 nm. In exemplary embodiments, there are at least two, and desirably at least three, reflectance levels within the range of about 10% to about 85% to provide color separation and optimal blending with the background. The nIR absorption characteristic may be tailored to provide an average reflection of less than about 85%, less than about 75%, or less than about 65% in the wavelength range of about 900 nm to about 1700 nm.

The level of reflectance preferred for any particular environment is dependent on the reflectance of the background that lies behind the article to be hidden by the reflective material. For example, a background of trees and leaves is known in the art to have a nIR reflectance between about 45% and 55% and a SWIR reflectance between about 5% and 65%. Because an article of the present invention can be tailored to have a reflectance that closely matches that of a treed background (or other background), the article will appear less visible when viewed in the dark through a night vision instrument.

It is to be understood that one unique aspect of the inventive reversible materials is that the infrared suppressive additives are decoupled from the visible camouflage in the printed surface so that the visible camouflage shades can be retained within desired specifications while simultaneously providing the necessary nIR and SWIR suppressive characteristics.

The reversible materials described herein are suitable for use in various applications, including but not limited to forming reversible garments (e.g. jackets, pants, ponchos, raincoats), tents, covers, bivy bags, and the like. Advantageously, the reversible material 10 exhibits high breathability on both sides of the material. In addition, the reversible materials demonstrate both nIR and SWIR reflectance on both sides of the garment to enable the reversible material to blend into the background and provide optimal camouflage.

Test Methods

It should be understood that although certain methods and equipment are described below, any method or equipment determined suitable by one of ordinary skill in the art may be alternatively utilized.

Infrared (IR) Test Method

Spectral reflectance data shall be determined on both sides of the fabric laminate and shall be obtained from 600 to 1700 nanometers (nm), for Woodland print, and 700 to 1700 nm, for Desert print, at 20 nm intervals from 700 to 860 nm and at 100 nm intervals from 900 to 1700 nm, on a spectrophotometer relative to the barium sulfate standard, the preferred white standard. Other white reference materials may be used provided they are calibrated to absolute white, e.g. magnesium oxide or vitrolite tiles. The spectral band width shall be less than 26 nm at 860 nm. Reflectance measurements may be made by either the monochromatic or polychromatic mode of operation. When the polychromatic mode is used, the spectrophotometer shall operate with the specimen diffusely illuminated with the full emission of a source that simulates either CIE source A or CIE source D65. The specimen shall be measured as a single layer, backed with six layers of the same fabric and shade. Measurements shall be taken on a minimum of two different areas and the data averaged. The measured areas should be at least 6 inches away from the selvage. The specimen shall be viewed at an angle no greater than 10 degrees from the normal, with the specular component included. Photometric accuracy of the spectrophotometer shall be within 1 percent and wavelength accuracy within 2 nm. The standard aperture size used in the color measurement device shall be 0.3725 inches in diameter. Any color having spectral reflectance values falling outside the limits in four or more of the wavelengths, in the 700-860 nm range, specified shall be considered a test failure (as per MIL-PRF-32142 and MC/PD 11-2011 SYSCOM A).

Durability Test Method (Laundering)

Place 2.0+0.2 pounds of the cloth, and if needed, ballast in an automatic washing machine set on permanent press cycle, high water level and warm (100+10° F.–0° F.) wash temperature. Place 0.5 ounce (14 grams) of 1993 AATCC Standard Reference Detergent (non-phosphate) without optical brighteners into the washer. The duration of each laundering cycle shall be 30+5 minutes. After laundering, place sample and ballast in an automatic tumble dryer set on permanent press cycle, 150-160° F. and dry for approximately fifteen to thirty (15-30) minutes or until dry. The laundering equipment, washer and dryer, shall be in accordance with AATCC No. 135.

Moisture Vapor Transmission Rate Test (MVTR)

The MVTR for each sample was determined in accordance with the general teachings of ISO 15496 except that the sample water vapor transmission (WVP) was converted into MVTR moisture vapor transmission rate (MVTR) based on the apparatus water vapor transmission (WVPapp) and using the following conversion.

$$MVTR=(\text{Delta }P\text{ value}*24)/((1/WVP)+(1+WVPapp\text{ value}))$$

To ensure comparable results, the specimens were conditioned at 73.4±0.4° F. and 50±2% rH for 2 hrs prior to testing and the bath water was a constant 73.4° F.±0.4° F.

The MVTR for each sample was measured once, and the results are reported as g/m²-24 hours.

EXAMPLES

Example 1

A reversible garment material was constructed in the following manner. A 30 denier (30D) by 30 denier (30D) printed, woven woodland MARPAT camouflage fabric with carbon incorporated into the ink used in the printing process is bonded as follows:

1) A three-layer film composite, approximately 0.27 mm thick was obtained consisting of a polyurethane layer sandwiched between two ePTFE layers. This laminate was constructed in accordance with the general teachings of U.S. Pat. No. 5,418,054 to Sun except that no phosphorous or other flame-retardant material was incorporated into the polyurethane layer. A fluoroacrylate, carbon-containing coating (to aid in controlling nIR reflectance), as generally taught in U.S. Patent Publication No. 2007/0009679 to Holcombe, et al. was then applied to one side of the film laminate in order to render it oleophobic while preserving the microporous structure.

2) The bond of the woodland MARPAT fabric layer to the 3 layer film composite was made by applying a dot pattern of a melted polyurethane adhesive to the non-coated side of the 3 layer film composite. While the polyurethane adhesive dots were molten, the fabric was positioned, non-printed side down, on top of the adhesive side of the three layer film composite. This construct was allowed to cool.

3) The resulting bonded construct, with the coated side of the film composite facing down, was then positioned on top of a 30D by 30D desert MARPAT camouflage woven fabric. Carbon was incorporated into the ink of the darker colors used in the printing process. The bonded construct and the desert camouflage fabric were subsequently bonded together by applying a dot pattern of a melted polyurethane adhesive to the coated side of the 3 layer composite film. While the polyurethane adhesive dots were molten, the fabric was positioned, non-printed side down, on top of the adhesive side of the three layer film composite. This construct was allowed to cool.

4) After the moisture curing adhesive has set, both sides of the reversible garment material were treated with a waterproofing agent.

Both initially and after 20 launderings, the construct met the spectral nIR reflectance specifications as set forth below in MIL-PRF-32142 (for Woodland print) and MC/PD 11-2011 SYSCOM A (for Desert print). Also, the construct demonstrated SWIR reflectance that closely matched the encountered background (dry soil and foliage), indicating that the reversible construct was effective in camouflaging the construct.

A seam tape was made in the following manner. A 30D by 30D desert MARPAT camouflage woven fabric was obtained. Carbon was incorporated into the ink of the darker colors used in the printing process. The camouflage fabric was bonded in a similar fashion as the described previously to the fluoroacrylate, carbon-containing side of a bicomponent ePTFE/PU film (to aid in controlling nIR and SWIR reflectance), as generally taught in U.S. Patent Publication No. 2007/0009679, and then the film side of this structure was subsequently completely coated with polyurethane.

Example 2

A reversible garment material was constructed in the following manner. A 30D by 30D printed, woven woodland MARPAT camouflage fabric with carbon incorporated into the ink used in the printing process is bonded as follows:

1) A three-layer film composite, approximately 0.17 mm thick was obtained consisting of a polyurethane layer sandwiched between two ePTFE layers. This laminate was constructed in accordance with the general teachings of U.S. Pat. No. 5,418,054 to Sun except that no phosphorous or other flame-retardant material was incorporated into the polyurethane layer.

2) The bond of the woodland MARPAT fabric layer to the 3 layer film composite was made by applying a dot pattern of a melted polyurethane adhesive to the 3 layer film composite. While the polyurethane adhesive dots were molten, the fabric was positioned, non-printed side down, on top of the adhesive side of the three layer film composite. This construct was allowed to cool.

The construct demonstrated nIR and SWIR reflectance that closely matched the encountered background (dry soil and foliage), indicating that the reversible construct was effective in camouflaging the construct.

The invention of this application has been described above both generically and with regard to specific embodiments. Although the invention has been set forth in what is believed to be the preferred embodiments, a wide variety of alternatives known to those of skill in the art can be selected within the generic disclosure. The invention is not otherwise limited, except for the recitation of the claims set forth below.

What is claimed is:

1. A reversible article having a first surface and a second surface, said reversible article comprising:
    (a) a center structure comprising a polyurethane layer sandwiched between a first microporous film and a second microporous film having thereon an oleophobic layer containing at least one infrared suppressive additive;
    (b) a first textile layer positioned on said first microporous film; and
    (c) a second textile layer positioned on said second microporous film such that said oleophobic layer is positioned adjacent said second textile layer,
    wherein infrared suppressive performance in said first surface and said second surface is different.

2. The reversible article of claim 1, wherein said first and second microporous films comprise expanded polytetrafluoroethylene.

3. The reversible article of claim 1, further comprising a first adhesive layer bonding said first textile layer to said first microporous film and a second adhesive layer bonding said second textile layer to said second microporous film.

4. The reversible article of claim 1, wherein said oleophobic layer is a fluoroacrylate oleophobic coating and said at least one infrared suppressive additive is carbon.

5. The reversible article of claim 1, wherein said at least one infrared suppressive additive is selected from carbon, aluminum, aluminum oxide, antimony, antimony oxide, titanium, titanium oxide, cadmium selinide, gallium arsenide and mixtures thereof.

6. The reversible article of claim 1, wherein said at least one infrared suppressive additive is present in said oleophobic layer in an amount from about 1% to about 15% by weight.

7. The reversible article of claim 1, wherein each of said first and second surface of said reversible article demonstrates an average reflection of about 75% or less in the wavelength range from about 700 nm to about 900 nm and an average reflection from about 10% to about 85% in the wavelength range from about 900 nm to about 1700 nm.

8. The reversible article of claim 1, wherein each of said first and second surface of said reversible article demonstrates an average reflection less than about 65% or less in the wavelength range from about 700 nm to about 900 nm and an average reflection less than about 75% in the wavelength range from about 900 nm to about 1700 nm.

9. The reversible article of claim 1, wherein said oleophobic layer contains differing levels of said at least one infrared suppressive additive to create a disruptive pattern in both the 700 nm to 900 nm and 900 nm to 1700 nm regions of the electromagnetic spectrum.

10. The reversible article of claim 1, wherein each of said first and second surface of said reversible article has a moisture vapor transmission rate of at least about 8000 $g/m^2/24$ hours, and
    wherein said moisture vapor transmission rates of said first and said second surface are substantially the same.

11. The reversible article of claim 1, wherein said reversible article has a mass/area less than about 300 $g/m^2$.

12. The reversible article of claim 1, wherein said first textile has thereon a woodland camouflage printed surface and said second textile has thereon a desert camouflage printed surface.

13. The reversible article of claim 1, wherein said article is a garment.

14. A reversible article having a first surface and a second surface, said reversible article comprising:
(a) a center structure comprising a polyurethane layer sandwiched between a first microporous film and a second microporous film having thereon an oleophobic layer, said second microporous film containing at least one infrared suppressive additive within said second microporous film;
(b) a first textile layer positioned on said first microporous film; and
(c) a second textile layer positioned on said second microporous film such that said oleophobic layer is positioned adjacent said second textile layer.

15. The reversible article of claim 14, wherein said first and second microporous films comprise expanded polytetrafluoroethylene.

16. The reversible article of claim 14, further comprising a first adhesive layer bonding said first textile layer to said first microporous film and a second adhesive layer bonding said second textile layer to said second microporous film.

17. The reversible article of claim 14, wherein each of said first and second surface of said reversible article demonstrates an average reflection of about 75% or less in the wavelength range from about 700 nm to about 900 nm and an average reflection from about 10% to about 85% in the wavelength range from about 900 nm to about 1700 nm.

18. The reversible article of claim 14, wherein said oleophobic layer contains differing levels of said at least one infrared suppressive additive to create a disruptive pattern in both the 700 nm to 900 nm and 900 nm to 1700 nm regions of the electromagnetic spectrum.

19. The reversible article of claim 14, wherein said oleophobic layer is a fluoroacrylate oleophobic coating and said at least one infrared suppressive additive is carbon.

20. The reversible article of claim 14, wherein each of said first and second surface of said reversible article has a moisture vapor transmission rate of at least about 8000 $g/m^2/24$ hours, and
wherein said moisture vapor transmission rate of said first and said second surface is substantially the same.

21. The reversible article of claim 14, wherein said reversible article has a mass/area less than about 300 $g/m^2$.

22. The reversible article of claim 14, wherein said article is a garment.

23. A reversible article having a first surface and a second surface, said reversible article comprising:
(a) a center structure comprising:
a first microporous film; and
a second microporous film having thereon an oleophobic coating containing at least one infrared suppressive additive, said second microporous film being bonded to said first microporous film;
(b) a first textile layer positioned on said first microporous film; and
(c) a second textile layer positioned on said second microporous film such that said oleophobic coating is positioned adjacent said second textile layer,
wherein infrared suppressive performance in said first surface and said second surface is different.

24. The reversible garment of claim 23, wherein said first microporous film and said second microporous film are bonded via an adhesive layer.

25. The reversible article of claim 24, wherein said adhesive layer is discontinuous.

26. The reversible article of claim 24, wherein said adhesive layer is continuous.

27. The reversible article of claim 23, wherein said first microporous film and said second microporous film form said center structure in the absence of an adhesive.

28. The reversible article of claim 23, wherein said first microporous film has thereon a coating containing at least one infrared suppressive additive.

29. The reversible article of claim 28, wherein a first amount of said infrared additive present on said first microporous film is different from a second amount of said infrared additive on said second microporous film.

30. The reversible article of claim 23, wherein said first and second microporous films comprise expanded polytetrafluoroethylene.

31. The reversible article of claim 23, further comprising a first adhesive layer bonding said first textile layer to said first microporous film and a second adhesive layer bonding said second textile layer to said second microporous film.

32. The reversible article of claim 23, wherein said oleophobic layer is a fluoroacrylate oleophobic coating and said at least one infrared suppressive additive is carbon.

33. The reversible article of claim 23, wherein said oleophobic layer contains differing levels of said at least one infrared suppressive additive to create a disruptive pattern in both the 700 nm to 900 nm and 900 nm to 1700 nm regions of the electromagnetic spectrum.

34. The reversible article of claim 23, wherein said first textile has thereon a woodland camouflage printed surface and said second textile has thereon a desert camouflage printed surface.

35. A reversible article having a first surface and a second surface, said reversible article comprising:
(a) a center structure comprising:
a first microporous film; and
a second microporous film having thereon an oleophobic layer, said second microporous film containing at least one infrared suppressive additive within said second microporous film;
(b) a first textile layer positioned on said first microporous film; and
(c) a second textile layer positioned on said second microporous film such that said oleophobic layer is positioned adjacent said second textile layer,
wherein infrared suppressive performance in said first surface and said second surface is different.

36. The reversible garment of claim 35, wherein said first microporous film and said second microporous film are bonded via an adhesive layer.

37. The reversible article of claim 36, wherein said adhesive layer is discontinuous.

38. The reversible article of claim 36, wherein said adhesive layer is continuous.

39. The reversible article of claim 35, wherein said first microporous film and said second microporous film form said center structure in the absence of an adhesive.

40. The reversible article of claim 35, wherein said first microporous film contains at least one infrared suppressive additive within said first microporous film.

41. The reversible article of claim 40, wherein a first amount of said infrared additive present within said first microporous film is different from a second amount of said infrared additive within said second microporous film.

42. The reversible article of claim 35, wherein said first and second microporous films comprise expanded polytetrafluoroethylene.

43. The reversible article of claim 35, further comprising a first adhesive layer bonding said first textile layer to said first microporous film and a second adhesive layer bonding said second textile layer to said second microporous film.

44. The reversible article of claim 35, wherein said oleophobic layer contains differing levels of said at least one infrared suppressive additive to create a disruptive pattern in both the 700 nm to 900 nm and 900 nm to 1700 nm regions of the electromagnetic spectrum.

45. The reversible article of claim 35, wherein said oleophobic layer is a fluoroacrylate oleophobic coating and said at least one infrared suppressive additive is carbon.

* * * * *